No. 660,935. Patented Oct. 30, 1900.
H. STAUFF.
SHUT-OFF VALVE FOR WATER CHAMBERS OF LIQUID FORCING APPARATUS.
(Application filed Dec. 20, 1899.)
(No Model.)
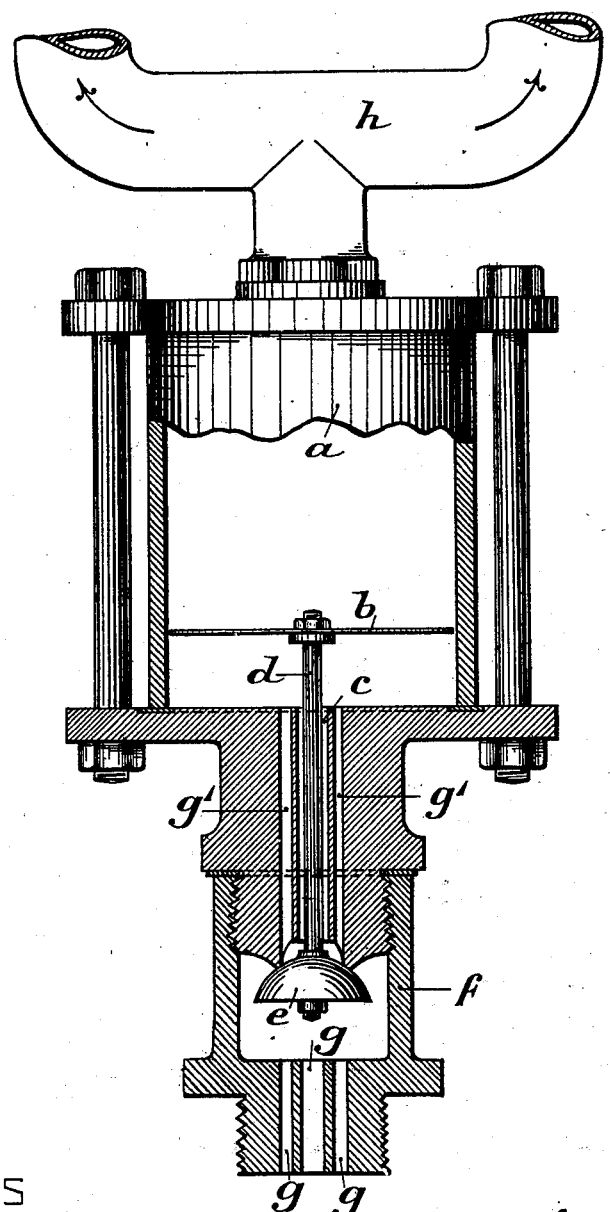
WITNESSES
INVENTOR

UNITED STATES PATENT OFFICE.

HEINRICH STAUFF, OF COLOGNE, GERMANY.

SHUT-OFF VALVE FOR WATER-CHAMBERS OF LIQUID-FORCING APPARATUS.

SPECIFICATION forming part of Letters Patent No. 660,935, dated October 30, 1900.

Application filed December 20, 1899. Serial No. 741,010. (No model.)

*To all whom it may concern:*

Be it known that I, HEINRICH STAUFF, brewery owner, a subject of the German Emperor, residing at 324 Konnerstrasse, Arnoldshöhe, Cologne, Germany, have invented certain new and useful Improvements in Shut-Off Valves for Water-Chambers of Liquid-Forcing Apparatus; and I do hereby declare the following to be a full, clear, and exact description of the invention, such as will enable others skilled in the art to which it appertains to make and use the same.

The automatic shut-off valves heretofore employed on the water-chambers of pressure apparatus for forcing beer consist of a ball floating on the water, which is made to close the air-conduit against the water as soon as the latter has risen sufficiently high in the glass chamber. Such shut-off valves are subject to the disadvantage that before the complete closing of the air-conduit by the ball-valve takes place a small quantity of water always passes into the air-conduit, which water collects in the air vessel and becomes stagnant, having the effect, on the one hand, of more or less impairing the purity of the air which is led in contact with the beer, and, on the other hand, gradually reducing the air-space in the air-vessel, so that the apparatus requires frequent adjustment. Such passage of water takes place in an increasing degree when the ball-valve has been in use for some time, when by the frequent pressing against the opening of the conduit it loses its accurate spherical form.

The present invention relates to a construction of shut-off valve apparatus whereby the above disadvantages are done away with, as it effectually prevents the passage of any water into the air-conduit. The arrangement of the valve apparatus for this purpose is as follows:

Referring to the accompanying drawing, which shows a vertical section of the apparatus, $a$ is a glass cylinder in which is situated a loosely-fitting thin disk $b$ of metal or other material, which is connected by a rod $d$, passing loosely through the tubular passage $c$ with the valve $e$ of elastic material. The combined parts are secured by screwing by means of a connecting-piece $f$ to the water-chamber below in precisely the same manner as with the existing shut-off valves, the chamber $a$ being connected at top to the air-conduit $h$.

When the water-supply to the water-chamber is opened, the air contained therein passes through the channels $g$ $g$ $g$ and $g'$ $g'$ $c$ into the vessel $a$ below the disk $b$ and between this and the glass cylinder upward into the air-conduit, the upward pressure of such air-current being made to hold the disk $b$ and the valve $e$ in a floating position in which the valve does not close the upper channels. When the air has been forced out of the water-chamber, water takes its place in the above-mentioned channels, and the upward pressure of this water upon the disk $b$ closes the valve $e$ upon its seat. The water can therefore only rise to such a height in the cylinder $a$ as to effect the closing of the valve, so that no water can ever penetrate into the air-conduit. It is not necessary for the correct action of the apparatus to keep the weight of the disk $b$ and the valve connected thereto so small that they are actually raised by the air-currents. It is only necessary to see that the disk $b$ and valve $e$ do not bear so close against the communicating channels as to prevent the air from passing through. On the rising of the water this will then raise the disk $b$ sufficiently to close the valve against further admission of water into the glass cylinder, as described.

Having now particularly described and ascertained the nature of this invention and in what manner the same is to be performed, I declare that what I claim is—

1. In an apparatus for forcing liquids by pneumatic pressure, the combination of an air-delivery conduit and a controlling vessel communicating with the air-conduit and arranged between the water-chamber of the pressure apparatus and said conduit, a disk loosely arranged in the controlling vessel, and a valve connected thereto to be actuated thereby and adapted to close or open the communication between the water-chamber and the air-conduit, whereby the water is prevented from entering the air-conduit.

2. In an apparatus for forcing liquids by pneumatic pressure, the combination of an air-delivery conduit and a controlling vessel communicating with the air-conduit and arranged between the water-chamber of the pressure apparatus and said conduit, with a disk adapted to move loosely in the said controlling vessel, and a valve of elastic material connected with the said disk and adapted to open or close the communication between the water-chamber and conduit, whereby the water is prevented from entering the air-conduit.

In testimony whereof I affix my signature in presence of two witnesses.

HEINR. STAUFF.

Witnesses:
LOUISE BARNES,
WILLIAM H. MADDEN.